United States Patent [19]

Cutler et al.

[11] 4,183,081
[45] Jan. 8, 1980

[54] INVERTER SYSTEM INCLUDING COMMUTATION FAILURE PREVENTION SCHEME

[75] Inventors: John H. Cutler, Roanoke; Loren H. Walker, Salem, both of Va.

[73] Assignee: General Electric Company, Salem, Va.

[21] Appl. No.: 957,108

[22] Filed: Nov. 2, 1978

[51] Int. Cl.² .................. H02P 13/24; H02M 1/06
[52] U.S. Cl. ............................ 363/81; 363/37; 363/58; 363/138
[58] Field of Search ................. 363/37, 55–58, 363/96, 136–138, 78–79, 81; 307/252 M

[56] References Cited

U.S. PATENT DOCUMENTS

| | | | |
|---|---|---|---|
| 3,336,520 | 8/1967 | Miyairi et al. | 363/56 X |
| 3,829,754 | 8/1974 | Rettig | 363/37 |
| 3,887,862 | 6/1975 | Hubner | 363/37 X |
| 3,942,090 | 3/1976 | Matthes et al. | 363/78 X |
| 4,028,607 | 6/1977 | Watanabe | 363/138 X |
| 4,039,926 | 8/1977 | Steigerwald | 363/138 |
| 4,066,938 | 1/1978 | Turnbull | 363/37 X |

*Primary Examiner*—J D Miller
*Assistant Examiner*—Peter S. Wong
*Attorney, Agent, or Firm*—Arnold E. Renner

[57] ABSTRACT

A controlled rectifier inverter system of the type in which the inverter circuit has capacitors across which voltages are developed as a function of the current output of the inverter, such voltages being utilized to commutate the rectifiers of the inverter circuit, includes means to limit the magnitude of the rise in output current between successive commutations of the rectifiers of a group to prevent the achievement of a current in excess of that which can be commutated by the voltages on the capacitors.

16 Claims, 4 Drawing Figures

INVERTER SYSTEM INCLUDING COMMUTATION FAILURE PREVENTION SCHEME

BACKGROUND OF THE INVENTION

The present invention relates generally to inverter systems employing inverter circuits of the type having a commutating capacitor and more particularly to systems employing such inverter circuits in conjunction with circuitry to guard against currents which become too large to be properly and dependably commutated.

There are many types of inverter systems. A number of these systems employ capacitors which are charged to a voltage value and that capacitor voltage is used during the next cycle to commutate an associated controlled rectifier. One such inverter system is the Autosequentially Commutated Current Source Inverter, sometimes more simply referred to as the Controlled Current Inverter. In this type of inverter, the value of the voltage on the capacitor is directly proportional to current which flows in the inverter circuit (i.e., the load current) prior to the last commutation of a rectifier of the group with which it is associated. Thus, the amount of current which can be commutated at any particular instant in time is directly proportional to the amount of current which was commutated by the particular rectifier group the last time. This being true, the amount of current rise which can be permitted between successive commutations is limited.

In many applications, the amount of current change between commutations creates no serious problem. For example, in a low performance motor drive where only slow changes in speed are required or when the load changes are gradual, the control may be designed to limit the rate of current rise and no problem will be experienced because of excess currents. In high performance drives, however, where rapid changes are required and thus high rates in change of currents are a necessity, the problems become more complex because the maximum permissible change in current between successive commutations is still limited by the design of the system. In addition, since many of these high performance applications require a variable frequency output, the rate of current change cannot be maintained constant without severely limiting the dynamic performance of the drive. One solution to the commutation problem which is sometimes proposed is to increase the size of the commutating capacitors. While the use of larger capacitors can substantially alleviate the problem of commutation failure at low frequencies, the top speed of the drive may be unacceptably limited for other reasons. Thus, solutions such as strictly limiting the rate of current rise and using larger capacitors are sometimes not acceptable.

SUMMARY OF THE INVENTION

It is, therefore, an object of the present invention to provide an improved power conversion system.

It is a further object to provide an inverter system of the type employing capacitors which are charged to a voltage proportional to the system current and subsequently discharged to provide commutation of the individual controlled rectifiers of the inverter.

It is a further object to provide an improved inverter system in which the total amount of current rise permitted between successive commutations of the rectifiers of a group is limited.

It is a still further object to provide an improved inverter system in which the total amount of current rise permitted between successive commutations of rectifiers of a group is limited as a function of the extant voltage across the capacitors.

The foregoing and other objects are achieved, in accordance with the present invention, by providing an inverter system including a source of d.c. power which provides an output current of controllable magnitude in response to input control signals applied to a control means associated with the d.c. power source. An inverter circuit, including a plurality of controlled rectifiers each having an associated commutating capacitor, is connected to the d.c. power source and is under the control of a further control means to govern the output of the inverter circuit. A first signal, representative of the value of the voltage across the capacitors associated with the rectifiers of an inverter group, and a second signal, proportional to the value of the output current from the d.c. power source (the system current), are combined in appropriate means to develop an overriding control signal for limiting the output of the power source when the two signals reach a prescribed relationship established by the maximum value of the current which the voltage across the capacitors can safely commutate.

As an additional feature, there is further provided means to inhibit or blank the generation of the overriding signal for a prescribed period of time following a firing of any of the rectifiers of the inverter to thus remove any restraints on the current rise during an initial time period when the voltage on the commutating capacitors is reversing.

BRIEF DESCRIPTION OF THE DRAWING

While the present invention is particularly defined in the claims annexed to and forming a part of this specification, a better understanding can be had from the following description taken in conjunction with the accompanying drawing in which:

DETAILED DESCRIPTION

Figure 1:
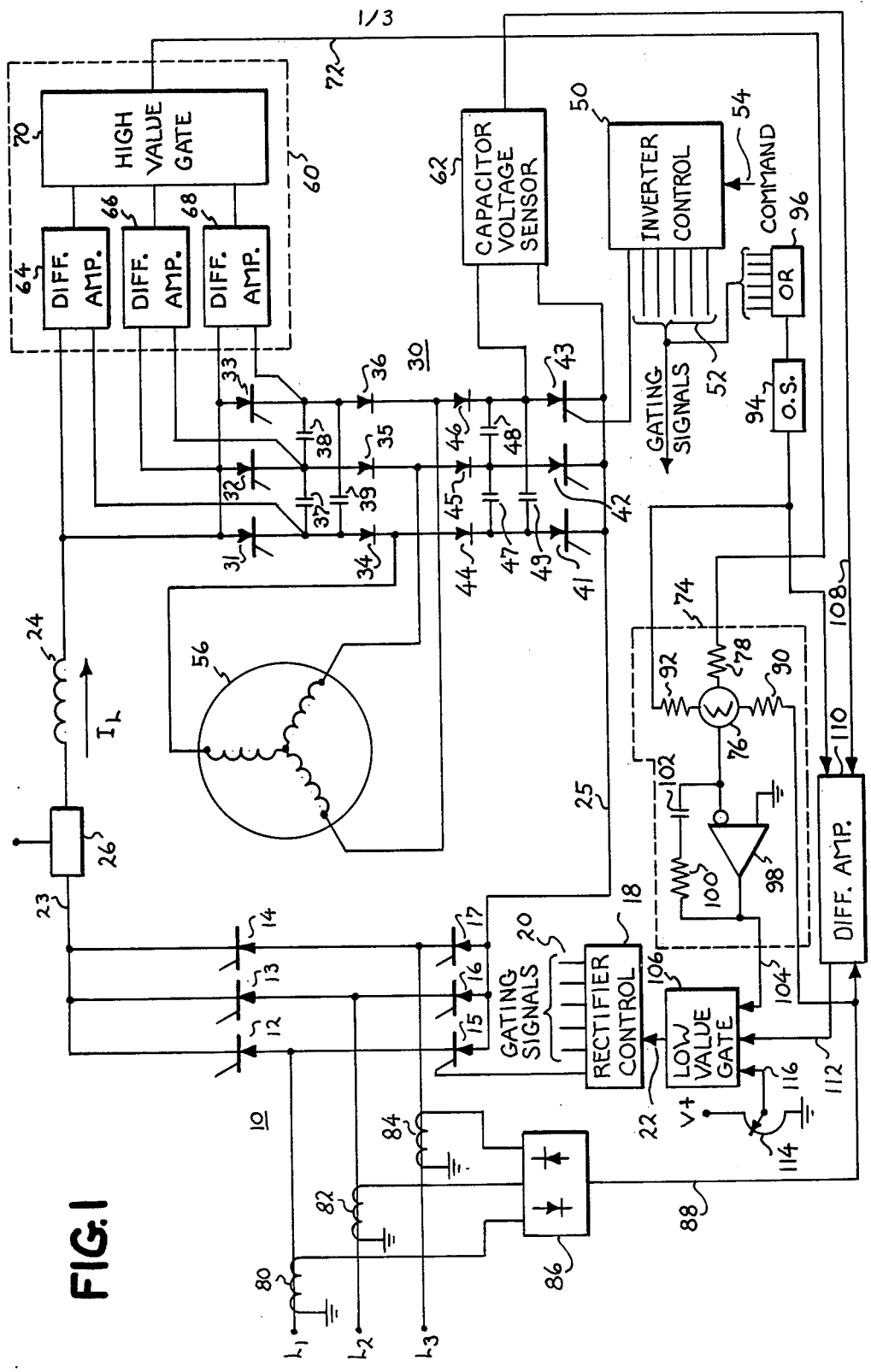
FIG. 1 is a schematic view illustrating the present invention in its preferred embodiment.

Referring now to FIG. 1 which shows the present invention in its preferred embodiment, there is provided a source of direct current (d.c.) power indicated generally at 10 which source includes a rectifying bridge, of known type, comprised of six controlled rectifiers 12 through 17. These controlled rectifiers are preferably of the general class known as thyristors, the most common form of which is the silicon controlled rectifier (SCR). The rectifiers are connected to a source of substantially constant frequency alternating current (a.c.) power as represented by the lines $L_1$, $L_2$ and $L_3$. The rectifier bridge is, preferably, operated in the conventional phase controlled mode to provide a controlled variable output current $I_L$ which may also be considered as the load or system current. Gating of the rectifiers to achieve the required control of current is accomplished through the use of a rectifier control 18 which provides a plurality of gating signals 20 to the rectifiers 12 through 17. For sake of simplicity, only one gating signal, that to rectifier 15, has been shown in its entirety. In the manner well known in the art, by controlling the time of conduction initiation within each half-cycle of the a.c. source, that is, by controlling the firing angle of the rectifiers, the amount of output current from the rectifier bridge can be controlled. As shown in FIG. 1, the control of the current $I_L$ is a function of a control signal on line 22 to the rectifier control 18. The control 18 may be of any suitable type; e.g., a ramp and pedestal, and the signal on line 22 will normally be of an analog nature such that its magnitude governs the operation of the control and hence the rectifier bridge.

An inverter circuit, indicated generally at 30, is shown connected to the d.c. power source 10 by way of a d.c. link circuit. The link circuit includes lines 23 and 25, to carry the current $I_L$, and an inductor 24 and may further include a resistor shunt 26. The inverter 30 is of a well-known type and includes a first or positive group of controlled rectifiers 31, 32, 33 and a negative group 41, 42, 43. Associated and serially connected with each of the controlled rectifiers 31, 32, 33 are, respectively, diodes 34, 35 and 36. A commutating capacitor is also associated with each of the rectifiers 31, 32, 33. Thus, capacitor 37 is connected between the cathodes of rectifiers 31 and 32 while a second capacitor 38 is connected between the cathodes of rectifiers 32 and 33. A third capacitor 39 is connected between the cathodes of rectifiers 31 and 33. In a like manner, the negative group of rectifiers 41, 42, 43 have correspondingly positioned diodes 44, 45, 46 and correspondingly positioned commutating capacitors 47, 48 and 49.

The output of the inverter circuit 30 is connected by suitable lines to an appropriate load shown as a three phase motor 56. The output of the inverter is under the control of an inverter control 50 which provides output gating signals 52 in response to an input command shown on line 54. Many types of controls are known to achieve the desired operation of this kind of inverter. Such controls normally include some form of oscillator; e.g., a voltage controlled oscillator, to effect the gating signals on line 52 as a function of the magnitude of the command voltage magnitude on line 54 and thus vary the output frequency of the inverter. Other forms of control could, of course, be used.

The description of FIG. 1 thus far has concerned only that which is well known in the art. The operation, briefly, is that under the output of the rectifier control 18, which provides phase control gating signals to the rectifiers 12 through 17, the system current $I_L$ is controlled in magnitude. Under the control of the inverter control 50, by way of gating signals 52, the rectifiers of the inverter circuit are controlled to provide an output signal whose frequency is a function of the inverter control and the magnitude of which is, of course, a function of the value of the current $I_L$. The commutation capacitors act in the customary fashion and are charged in accordance with the current delivered to the load 56. As an example, let it be assumed that rectifiers 31 and 43 are conducting. In this case, a current path is established through capacitor 37 and that capacitor will charge positive at its left-hand plate. The amount of this charging will be a function of the current flowing. When rectifier 32 is next fired, the voltage on capacitor 37 will commutate or render rectifier 31 nonconductive and capacitor 37 will now charge positively at its right-hand plate to be available for subsequent use in commutating rectifier 32 when rectifier 33 is fired. This type of operation is well known in the art and further detailed explanation is believed unnecessary. It should be noted, however, that the depiction of FIG. 1 has, for purposes of clarity and simplicity and because they do not affect the overall concept of the invention, ignored such standard ancillary components as snubber circuits and di/dt chokes which would be placed in the various conversion units all as is the prevailing practice in the discipline.

Figure 2:
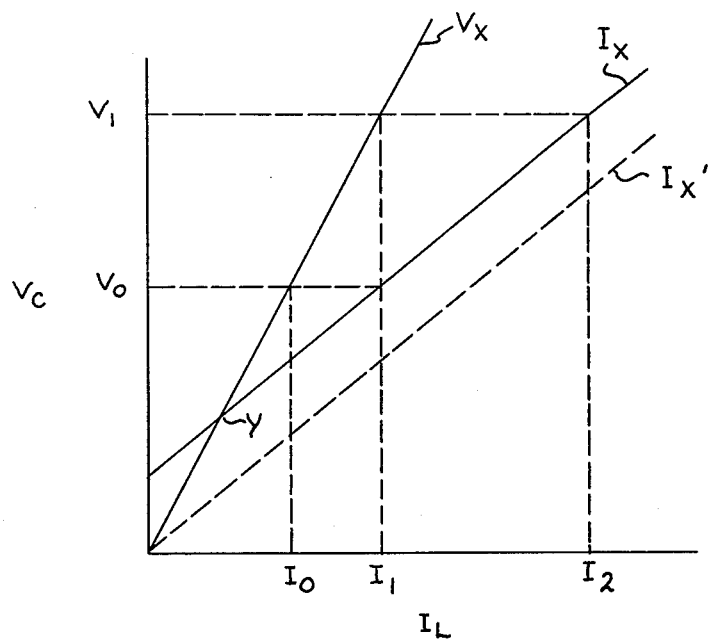
FIGS. 2 and 3 are graphs useful in the understanding of the need for and the operation of the present invention; and, FIG. 4 shows various voltage wave forms in the converter system.

Before proceeding with the remainder of the description of FIG. 1, it is believed well to establish the relationships which exist between the voltages across the capacitors and the currents which those voltages will effectively commutate. This relationship is illustrated in FIG. 2 which plots the capacitor voltage ($V_c$) against the load or system current ($I_L$). It can be shown mathematically, as is illustrated in the graph of FIG. 2, that the voltage produced on a capacitor by a given current is capable of commutating a higher current at the next commutation time. It can further be shown that the relationships between the capacitor voltages and the currents are substantially linear. In FIG. 2, the line designated $V_X$ defines the relationship of the voltage which will exist across a capacitor as a function of the last load current commutated. The line shown in dashed form ($I_X'$) is the theoretical or no-loss representation of the linear relationships existing with respect to the amount of current which can be commutated with a given capacitor voltage. However, since the circuit inherently possesses some losses in the snubber circuits, rectifiers, chokes, etc., even though these losses are not large, they are of sufficient magnitude to be considered. Thus, the line $I_X$ of FIG. 2 represents the actual relationship between the capacitor voltage $V_c$ and the actual current $I_L$ which can be commutated by that voltage. The vertical offset of line $I_X$ from $I_X'$ represents the various losses.

Referencing now FIG. 2, it is seen that with a load current $I_0$, a voltage $V_0$ will be produced across the capacitor. This same voltage when referenced to the line $I_X$ shows that a higher current, $I_1$, may be commutated. The difference represented by the horizontal distance between $I_0$ and $I_1$ represents the amount of current increase which can be accommodated betwen these two successive commutations of these same rectifiers. In a similar manner, the current $I_1$ will produce a capacitor voltage $V_1$ which will permit the commutation of a higher current $I_2$, with the distance between $I_1$ and $I_2$ being the difference in the amount of current which can be commutated on a second occurrence in the present example. From this showing, it is apparent that if, for example, a current $I_0$ were present at the time of a first commutation and if, because of the demands on the system, at the time of the next commutation a current greater than $I_1$ existed, the voltage on the capacitors would be insufficient and a commutation failure would result. The point of which the two lines $V_X$ and $I_X$ cross, point y, represents a critical point since operation below this point, without additional consideration, is not possible as the voltage would never be high enough to commutate the current.

Figure 3:
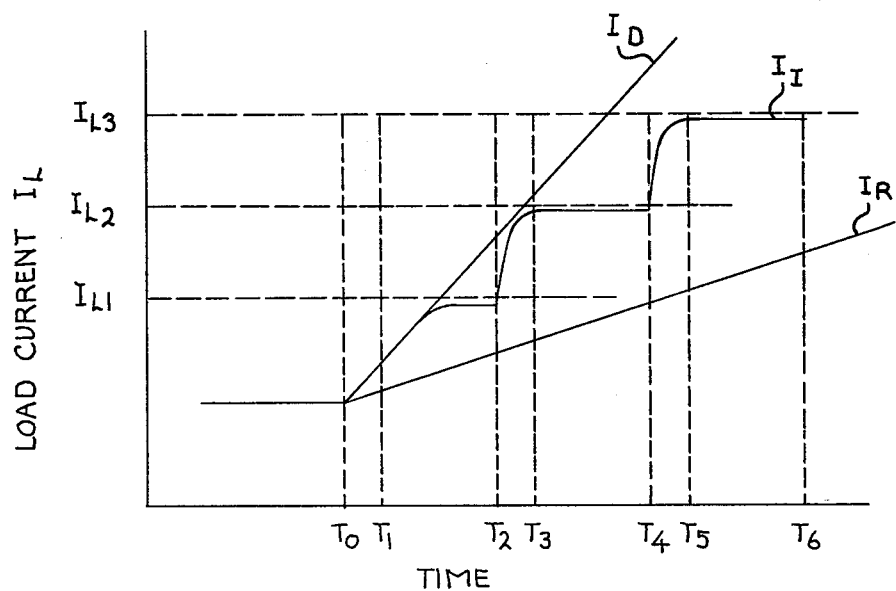

FIG. 3 further illustrates some of the problems of inverter operation which have been discussed and also functionally illustrates the manner in which the present invention achieves the desired results. In FIG. 3, the load current $I_L$ is plotted as a function of time. The three designated load currents ($I_{L1}$, $I_{L2}$ and $I_{L3}$) represent, respectively, the maximum currents which can be commutated at three successive commutation times $T_2$, $T_4$ and $T_6$ which also, of course, correspond to three successive firing times of the inverter rectifiers. Line $I_D$ represents a supposed demand which is suddenly placed upon the system as a whole as, for example, by a sudden increase in the load on the motor. It is readily apparent from a viewing of FIG. 3 that the currents represented by line $I_D$ exceed the permissible limits defined by $I_{L1}$, $I_{L2}$ and $I_{L3}$ and that allowing the inverter system to attempt to achieve the $I_D$ goal will result in commutation failure and, possibly, system failure. Line $I_R$ represents one possible solution to the commutation failure problem and represents the limiting of the rate of current rise by some means such that under all circumstances there would be adequate voltage developed on the capacitors to assure commutation. However, the difference between the operations represented by lines $I_R$ and $I_D$ readily illustrates that this is an unsatisfactory solution for many types of operations.

The step configuration (line $I_I$) shown in FIG. 3 represents the operation of the inverter system in accordance with the present invention. Viewing the $I_I$ configuration it is seen that at time $T_0$, when the increased demand is first placed upon the system, the current is allowed to rise in accordance with that demand. This rise is permitted until it approaches the limit of the current permissible as defined by the current at the time of the last commutation; that is, $I_{L1}$. When that limit is approached, further rise in the current is prohibited and the current remains constant until the next commutation time, time $T_2$. Because the charges on the capacitors have now risen because of the rising current (see FIG. 2), the current is once more permitted to rise at a high rate until it approaches the next current limit, $I_{L2}$. The current then is prevented from rising further until the time of the next commutation at time $T_4$. This cycle is repeated until the demand is met or the system is otherwise limited. Thus, it is seen that the present invention permits a more rapid rise of the current in response to a high demand without exceeding the commutation limits of the system. The time periods $T_0$–$T_1$, $T_2$–$T_3$ and $T_4$–$T_5$ represent the blanking periods earlier mentioned and which will be discussed in detail with respect to FIG. 4.

From the foregoing description, particularly that with respect to FIGS. 2 and 3, it is apparent that the amount of current which can be commutated at any particular instant is a function of the existing voltage on the commutating capacitors which in turn is a function of the last current commutated. The present invention recognizes this fact and establishes a relationship between the existing voltage and the amount of current to determine when the current from the d.c. source should be limited. (In the preferred embodiment as here being described, the current limiting function is achieved by controlling the conduction of the rectifiers 12–17.) To this end, two signals are produced. The first of these signals is proportional to the value of the voltage across the capacitors and the second signal is proportional to the load current which is, of course, essentially the same as the d.c. current and the inverter current. Referencing again the FIG. 1 embodiment, a pair of capacitor voltage sensors 60 and 62 provide the first signal. Inasmuch as these two units are functionally identical, only unit 60 has been shown in detail. Capacitor voltage sensor 60 includes three differential amplifiers 64, 66, 68 which are connected, respectively, across the three rectifiers 31, 32, 33. It will be recognized, for example, that if rectifier 32 is in its conducting state, the voltage across rectifier 31 is essentially the equivalent of the voltage across the capacitor 37. The same is true with respect to differential amplifier 66 and capacitor 38 and differential amplifier 68 and capacitor 39. Thus, differential amplifiers provide, at their respective outputs, signals which are proportional to the voltages across the three capacitors 37, 38, 39. These three signals are applied to a state-of-the-art high value gate 70 which outputs, on its output line 72, a signal proportional to the highest value of the voltages across the three capacitors 37, 38, 39. (It is here specifically recognized that this is an approximation of the actual capacitor voltages and that suitable sensing means such as differential amplifiers could be placed directly across the capacitors 37, 38, 39. Actual sensing was not done in this particular case of the preferred embodiment of the invention for the simple reason that the voltages across the rectifiers themselves were needed for other purposes and by so using these amplifiers in the manner shown in FIG. 1, the expense of additional circuitry was alleviated.)

The output from the high value gate 70 on line 72 serves as one input to an operational amplifier circuit 74 the output of which is proportional to the algebraic sum of its inputs. The circuit 74 includes a summing junction 76 and the signal on line 72 is applied to that summing junction 76 by way of a suitable input resistor 78.

The second basic signal as earlier discussed is proportional to the load current $I_L$. There are several possible ways of developing this signal. In the illustrated embodiment this is done by sensing the respective phase currents connecting the a.c. source represented by lines $L_1$, $L_2$ and $L_3$ to the rectifiers 12 through 17. As illustrated, three current transformers 80, 82, 84 are connected, respectively, to the three lines $L_1$, $L_2$, $L_3$. The transformer outputs are supplied to a state-of-the-art full wave rectification system 86 such that there appears on the output thereof, line 88, a signal which is proportional to the load current. The signal on line 88 is applied to the summing junction 76 of the operational amplifier circuit 74 by way of a suitable input resistor 90. It is also recognized that other means could be used to generate this current signal. One possible alternative is represented by the shunt 26 which could be used to produce a signal proportional to the current $I_L$. The method using the current transformers was employed in the present example because of the need, for other purposes, to have signals representing the phase current supplied to the rectifying bridge and the recognition that the sum of the phase currents is proportional to the actual load or system current.

The third input to the amplifier circuit 74 is by way of a resistor 92 which is connected to the summing junction 76 and receives a signal from a monostable multivibrator or one-shot 94. This signal represents the blanking pulse previously mentioned. One-shot 94 is activated by an output from an OR gate 96 which receives at its input the six gating signals 52 from the inverter control 50. Thus, with each occurrence of a gating signal 52, OR gate 96 will output a signal which in turn activates the one-shot 94 to furnish, for a specified period of time, a signal to the summing junction 76 by way of resistor 92. The output of summing junction 76 is applied to the inverting input of an operational amplifier 98 having its non-inverting input connected to ground and its output connected to its inverting input by way of a series combination of a resistor 100 and a capacitor 102 such that the operational amplifier 98 acts in the integrating mode. The output of the circuit 74, the output of the operational amplifier 98, is applied by way of a signal line 104 to one input of a low value gate 106 the output of which is the control signal 22 to the rectifier control 18. Low value gate 106 may be any of those well known in the art which serves to provide, at its output, a signal which is proportional to the lowest of its input signals.

The description thus far with respect to the voltage sensing and the amplifier circuit 74 has been with respect to the positive bank of resistors 31, 32, 33. An identical arrangement which has not been shown in detail for the negative bank of rectifiers 41, 42, 43 includes the capacitor voltage sensor 62 which has been shown with only two leads connected but which is connected in an identical manner as 60 with respect to the negative rectifiers. Sensor 62 outputs, on line 108, a signal to a second operational amplifier circuit 110 which is in all material aspects identical to that shown at 74. Amplifier circuit 110 also receives the current signal by way of line 88 and the output from the one-shot 94 such that circuit 110 provides (line 112), for the negative rectifier group, a signal to the low value gate 106 corresponding to that from amplifier circuit 74 on line 104.

The third input to the low value gate 106 is the output of the wiper arm of a potentiometer 114 which is shown connected between a source of positive potential V+ and ground. This connection is made by the way of line 116. Potentiometer 114 represents, symbolically, the basic control of the system and it is the value of the signal on line 116 which normally governs the operation of the system subject to the overriding function of the output on the two lines 104 and 112. It should be recognized that the potentiometer 114 is strictly symbolic and that, although it is possible that this function would be achieved by a hand-operated control such as the potentiometer shown, it is more likely that the basic control signal for the d.c. current source would have its origin in a far more complicated feedback system concerning the total operation of the conversion system.

Having described the basic components of the system, the operation is substantially as follows. Assuming that operation is stable, the magnitude of the output of the system, the output from the inverter 30 to the load 56, will be a function of the value of the signal on line 116 which is applied by gate 106 to line 22 and thus to the rectifier control 18. The frequency of operation of the total system is, of course, a function of the command signal on line 54 to the inverter control 50. The polarities of the signals on lines 72 and 88 (the capacitor voltage and load current signals, respectively) are preferably of opposite polarity. For example, the signal on line 72 would be positive while that on line 88 would be negative. Thus, so long as the voltage signal on line 72 were of higher magnitude than the current signal on line 88, indicating that the voltage on the capacitor is of sufficient magnitude to commutate the extant current, the output on line 104 from the amplifier 98 would be of a higher value than that existing on line 116 and the signal on line 116 would thus remain in control. (The same rational holds true for the negative half of the inverter; i.e., the circuitry associated with thyristors 41, 42, 43 including the capacitor voltage sensor 62 and amplifier circuit 110.) Assume now, however, a demand for an increased load current. The signal on line 116 will rise in an effort to cause the rectifier control 118 to advance the phase of the firing of the rectifiers 12-17 to cause a larger load current. As such, the value of the signal on line 88 would rise. However, since the capacitors are still at the voltage established by the current at the time of the previous commutation, the value of the signal on line 72 will be unchanged and thus the output of summing junction 76 will tend to go positive. A positive signal applied to the inverting input of the integrating operational amplifier 98 will result in a negative output on line 104 to the gate 106. If the current were to rise far enough so as to reach a value where commutation might be a problem, as was described with respect to FIG. 3, the signal on line 104 will be sufficiently negative to "override" the signal from potentiometer 114 by being lower in value and thus being the signal passed by gate 106. The same type of overriding signal would also be available from amplifier circuit 110 if the negative rectifiers of inverter 30 were involved. Thus, it is seen that through this scheme there is provided an overriding signal which will, in effect, permit the current to rise (FIG. 3) to a point where commutation by way of the capacitor voltage becomes a problem. At that time, the current is prevented from rising further until such time as the next commutation has occurred and the voltage on the capacitor is once again reestablished at a different value, normally higher than before due to the rising load current.

Figure 4:
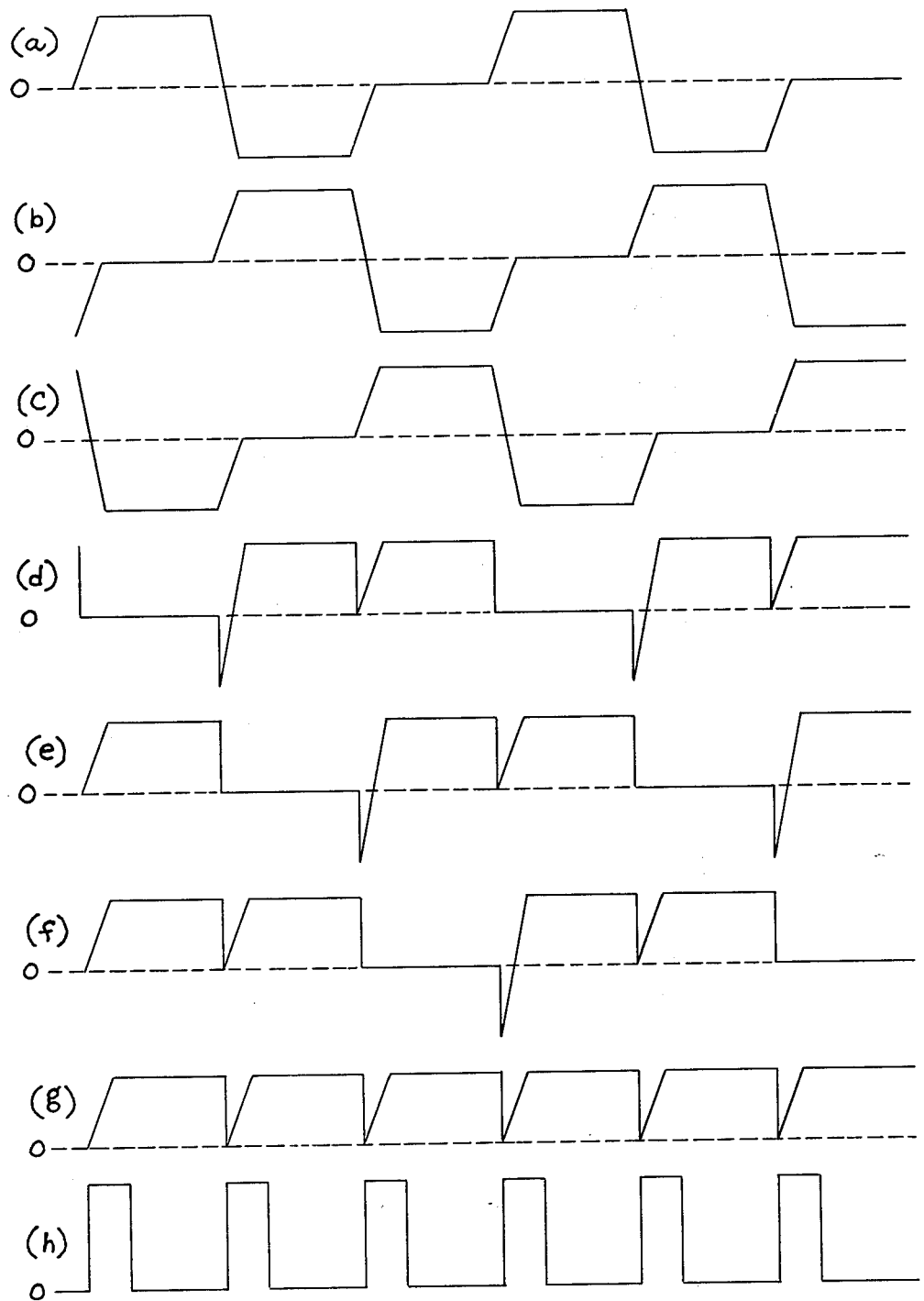

The remaining feature, which has been briefly discussed several times but not described in detail, concerns the blanking pulses which are applied to the summing junction 76 by way of the resistor 92. To this point the description of the present invention has proceeded on the assumption that the output of gate 70 (line 72) is basically a steady-state value which shows relatively gradual changes as the inverter circuit operation changes. This is not entirely a correct assumption as can be seen from FIG. 4 which shows the voltage wave forms associated with the inverter at constant current operation. In FIG. 4, graphs a, b and c show the wave forms on capacitors 37, 38 and 39, respectively. Graphs d, e, and f show the corresponding voltage wave forms, respectively, for the controlled rectifiers 31, 32 and 33. As shown, and as is well known, the voltage across a rectifier is at substantially zero volts while it is conducting, goes negative at the time of commutation, and is then at some positive value while in the nonconducting state. Graph g shows the output of the high value gate 70 as seen on line 72 which is, as previously explained, representative of the highest value across any of the three associated rectifiers. (It is noted that this is also the highest voltage, in absolute magnitude, across any of the three associated capacitors.) It is apparent from viewing graph g that the signal on line 72 is not a steady-state value but does include a series of notches where the voltage goes essentially to zero. These notches occur with each commutation of the controlled rectifier.

If the amplifier circuit 74 were to receive these notches without some form of compensation, it would repeatedly attempt to reduce the current to zero, rendering the total circuit operation unsatisfactory. Conceivably, the integration function associated with amplifier 98 could be made sufficiently slow so as to damp out the notches. This, however, would so seriously degrade the dynamic response of the system that the value of the present invention would be lost. Other types of filtering were considered but discarded in favor of the blanking function previously mentioned. The blanking function which is incorporated into the preferred embodiment of the present invention masks the notches appearing in the signal on line 72. The introduction of this blanking signal introduces no risk of commutation failure since it is designed to occur only during an interval in which no commutation will be commanded.

Graph h of FIG. 4 illustrates the blanking pulses. It will be remembered from the earlier description of FIG. 1 that these pulses are initiated by the occurrence of a gating signal 52 and it is seen further that they are present during the commutation of the controlled rectifiers. These pulses are applied to junction 76 by way of resistor 92 with each gating signal of the inverter. This signal is of the same polarity as the voltage signal on line 72 such that insofar as the output of the summing junction is concerned, the blanking signal has the same effect as a large voltage on the capacitors. The blanking signal occurs during the periods $T_0$-$T_1$, $T_2$-$T_3$ and $T_4$-$T_5$ (FIG. 3) which represent the "time-out" period of the one-shot 94. During these periods, the relative values of the load current and capacitor voltage values is of no consequence.

The above description with regard to blanking pulses was with regard only to the positive side of the inverter. It is to be expressly recognized that there is also a similar development of blanking signals for application to the operational amplifier circuit 110 for the negative side of the inverter.

Thus, it is seen that there has been shown and described an inverter system in which the current rise betwen successive commutations has been successfully limited to assure that the voltage existing on the capacitors will be sufficient in all cases to provide adequate commutation.

While there has been shown and described what is at present considered to be the preferred embodiment of the present invention, modifications thereto will readily occur to those skilled in the art. As examples, a different method of sensing capacitor voltage than that specifically illustrated has been described as has an alternate method of determining the load current. Other methods for performing these functions or for performing the blanking operation, or an equivalent thereof, will occur to those skilled in the art. It is not desired, therefore, that the invention be limited to the specific arrangement shown and described and it is intended to cover in the appended claims all such modifications as fall within the true spirit and scope of the invention.

What is claimed is:

1. A power conversion system comprising:
   (a) a source of direct current power capable of providing an output current of controllable magnitude;
   (b) control means for controlling the magnitude of the said output current in response to input control signals;
   (c) an inverter circuit comprising a plurality of controlled rectifiers and a plurality of associated commutating capacitors;
   (d) control means for said inverter circuit;
   (e) means for providing a first signal representative of the value of the voltages across said capacitors;
   (f) means for providing a second signal proportional to the value of said output current; and,
   (g) overriding control means responsive to said first and second signals to develop a dominant input control signal to said control means for controlling said output current under prescribed relationships of said first and second control signals.

2. The invention in accordance with claim 1 wherein said control means for said inverter circuit provides gating signals for the individual rectifiers of the inverter circuit and further including means responsive to said gating signals to develop a blanking signal for a prescribed period of time after each occurrence of a gating signal, said blanking signal serving to render said override control means ineffective.

3. The invention in accordance with claim 1 wherein said means to provide said first signal includes means to sense the voltages across each inverter rectifier and means to select, for application to the override control means, a representation of the highest voltage value.

4. The invention in accordance with claim 1 wherein said means to provide said first signal includes:
   (a) a plurality of differential amplifiers individually connected to sense the voltage across an associated inverter rectifier and to provide a voltage signal proportional thereto; and,
   (b) gate means for receiving a plurality of the voltage signals and for passing only that signal having the highest value to serve as said first signal.

5. The invention in accordance with claim 1 wherein said overriding control means comprises an operational amplifier circuit responsive to said first and second signals.

6. The invention in accordance with claim 2 wherein the means to develop the blanking signals includes an OR gate for receiving gating signals and a monostable multivibrator connected to the output of said OR gate for providing said blanking signal.

7. A power conversion system for converting alternating current power to variable frequency alternating current power by way of a direct current link circuit comprising:
   (a) a source of alternating current power;
   (b) a controllable rectifier unit connected to said source for providing a variable magnitude direct current to the link circuit;
   (c) control means for said rectifier unit for governing the magnitude of said direct current;
   (d) an inverter circuit including a plurality of controlled rectifiers for outputting the variable frequency alternating current power, said inverter circuit further including a commutating capacitor associated with each rectifier;
   (e) control means for said inverter circuit for controlling the operation thereof;
   (f) means to develop a first signal representative to the voltages across said capacitors;
   (g) means to develop a second signal proportional to the value of the current in the direct current link circuit; and,
   (h) means responsive to said first and second signals to generate an overriding control signal, said overriding control signal being supplied to the control means for said rectifier unit and serving to limit the output of the rectifier unit.

8. The invention in accordance with claim 7 wherein said control means for said inverter circuit provides gating signals for the individual rectifiers of the inverter circuit and further including means responsive to said gating signals to develop a blanking signal for a prescribed period of time after each occurrence of a gating signal, said blanking signal serving to render said override control means ineffective.

9. The invention in accordance with claim 7 wherein said means to provide said first signal includes means to sense the voltages across each inverter rectifier and means to select, for application to the override control means, a representation of the highest voltage value.

10. The invention in accordance with claim 7 wherein the means to develop said second signal includes means to sense alternating currents occurring in a connection between said source of alternating current power and said rectifier unit.

11. The invention in accordance with claim 7 wherein means to develop said second signal comprises shunt means in said direct current line circuit.

12. The invention in accordance with claim 7 wherein said means to provide said first signal includes:
  (a) a plurality of differential amplifiers individually connected to sense the voltage across an associated inverter rectifier and to provide a voltage signal proportional thereto; and,
  (b) gate means for receiving a plurality of the voltage signals and for passing only that signal having the highest value to serve as said first signal.

13. The invention in accordance with claim 7 wherein said means to generate the overriding control signal includes an operational amplifier circuit responsive to said first and second signals.

14. The invention in accordance with claim 8 wherein the means to develop the blanking signals includes an OR gate for receiving gating signals and a monostable multivibrator connected to the output of said OR gate for providing said blanking signal.

15. A power conversion system comprising:
  (a) a source of variable magnitude direct current;
  (b) means for controlling the magnitude of said direct current;
  (c) an inverter circuit for receiving said direct current and for providing alternating current power to a load, said inverter circuit including positive and negative groups of controlled rectifiers and a plurality of commutating capacitors;
  (d) means to control the output frequency of said inverter circuit;
  (e) a link circuit connecting said source and said inverter circuit for supplying said direct current to said inverter circuit;
  (f) means for providing a first capacitor voltage signal as a function of the voltages across the capacitors associated with the rectifiers of said positive group of rectifiers;
  (g) means for providing a second capacitor voltage signal as a function of the voltages across the capacitors associated with the rectifiers of said negative group of rectifiers;
  (h) means to provide a current signal representative of the value of the magnitude of said direct current; and,
  (i) overriding control means responsive to said first and second capacitor voltage signals and to said current signal to develop a dominant control signal for application to said means for controlling the magnitude of said direct current, said dominant control signal being developed where a defined relationship exists between either of said capacitor voltage signals and said direct current signal.

16. The invention in accordance with claim 15 wherein said control means for said inverter circuit provides gating signals for the individual rectifiers of the inverter circuit and further including means responsive to said gating signals to develop a blanking signal for a prescribed period of time after each occurrence of a gating signal, said blanking signal serving to render said override control means ineffective.

* * * * *